United States Patent
Nishimiya et al.

(10) Patent No.: US 7,311,312 B2
(45) Date of Patent: Dec. 25, 2007

(54) CHUCK DRAWING A WORK AGAINST THE CHUCK-FACE

(75) Inventors: Tamio Nishimiya, Fukuyama (JP); Satoshi Isohisa, Fuchu (JP); Naoyuki Masatsugu, Fukuyama (JP); Toshihito Nakamura, Hiroshima (JP)

(73) Assignee: Kabushiki Kaisha Kitagawa Tekkosho, Fuchu-shi (JP)

( * ) Notice: Subject to any disclaimer, the term of this patent is extended or adjusted under 35 U.S.C. 154(b) by 338 days.

(21) Appl. No.: 10/484,095

(22) PCT Filed: Jul. 15, 2002

(86) PCT No.: PCT/JP02/07170

§ 371 (c)(1),
(2), (4) Date: Jan. 14, 2004

(87) PCT Pub. No.: WO03/008135

PCT Pub. Date: Jan. 30, 2003

(65) Prior Publication Data
US 2004/0169342 A1 Sep. 2, 2004

(30) Foreign Application Priority Data
Jul. 18, 2001 (JP) .............................. 2001-218002

(51) Int. Cl.
*B23B 31/16* (2006.01)
*B23B 31/171* (2006.01)
*B23B 31/177* (2006.01)
(52) U.S. Cl. ..................... 279/121; 279/123
(58) Field of Classification Search ................ 279/121, 279/123, 118, 119, 122
See application file for complete search history.

(56) References Cited

U.S. PATENT DOCUMENTS

| | | | | | |
|---|---|---|---|---|---|
| 2,722,427 | A | * | 11/1955 | Labeyrie ...................... | 279/119 |
| 3,472,526 | A | * | 10/1969 | Hohwart ...................... | 279/106 |
| 3,512,794 | A | * | 5/1970 | Lohman ...................... | 279/123 |
| 3,560,010 | A | * | 2/1971 | Hohwart ...................... | 279/123 |
| 3,771,780 | A | * | 11/1973 | Doocey ...................... | 269/153 |
| 3,814,449 | A | * | 6/1974 | Buck ......................... | 279/2.09 |
| 4,007,943 | A | * | 2/1977 | Scharfen et al. ............ | 279/121 |
| 4,026,566 | A | * | 5/1977 | Rohm ........................ | 279/121 |
| 4,198,067 | A | * | 4/1980 | Steinberger ................. | 279/121 |
| 4,352,500 | A | * | 10/1982 | Blattry et al. ............... | 279/121 |
| 4,735,422 | A | * | 4/1988 | Kurogi et al. .............. | 279/121 |
| 4,982,970 | A | * | 1/1991 | Otani et al. ................. | 279/123 |

(Continued)

*Primary Examiner*—Cheryl Tyler
*Assistant Examiner*—Michael W. Talbot
(74) *Attorney, Agent, or Firm*—Flynn, Thiel, Boutell & Tanis, P.C.

(57) ABSTRACT

A chuck body is made up of axially movable plungers and jaws, in which the jaw has a master jaw body obliquely arranged with respect to an axis of the chuck body, the jaw also has a front face of the master jaw body and a rear end face of a master jaw head for restricting a position of the jaw with respect to the chuck body, a plunger receives a bushing which acts as a wedge means cooperating with the master jaw body, a driver at a rear end of the master jaw body being restricted in a backward movement within a range of a gap δ, and a wedge having a structure of canceling a moment applied to the jaw as a result of clamping, the driver providing a reactant force to the master jaw body for canceling a drawing force applied to a plunger.

12 Claims, 16 Drawing Sheets

U.S. PATENT DOCUMENTS

| | | | | |
|---|---|---|---|---|
| 5,158,307 A | * | 10/1992 | Toyano et al. | 279/121 |
| 5,605,343 A | * | 2/1997 | Barbieux | 279/132 |
| 6,089,578 A | * | 7/2000 | Chai | 279/139 |
| 6,170,835 B1 | * | 1/2001 | Noss | 279/2.07 |
| 6,299,179 B1 | * | 10/2001 | Sheffer | 279/4.12 |
| 6,371,493 B1 | * | 4/2002 | Barbieux | 279/106 |
| 6,375,197 B1 | * | 4/2002 | Barbieux | 279/132 |
| 6,454,278 B1 | * | 9/2002 | Wrobel et al. | 279/130 |
| 6,474,658 B2 | * | 11/2002 | Hanai | 279/106 |
| 6,837,499 B2 | * | 1/2005 | Rohm et al. | 279/106 |

* cited by examiner

CHUCK DRAWING A WORK AGAINST THE CHUCK-FACE

FIELD OF THE INVENTION

The invention relates to a chuck construction, which draws a work against the chuck-face.

BACKGROUND OF THE INVENTION

A chuck, which draws a work against the chuck-face, is disclosed in U.S. Pat. No. 3,460,849 or in German Patent laid open No. 2 639 818. The chuck of this type, as the conventional chuck, a jaw is also drawn with a part of the chuck body, being guided along a guide slot radially disposed at the chuck body and restricted in axial and radial movement, when a work piece is drawn.

A general construction of these chucks, for instance, a chuck disclosed in U.S. Pat. No. 3,460,849, is shown in FIG. 16.

As shown in FIG. 16, a chuck body 60 generally comprises a first or outer body part 61 having an inner rear face for engaging the spindle (not shown) of a lathe. The first body part 61 is generally annular in shape and an inner body 62 is slidably mounted in concentric relation with respect thereto for slidable movement in an axial direction between a retracted position wherein an external shoulder defined in said second body part engages a radially extending internal shoulder on the first body 61.

There is provided a T-slot 68, 70 in a plug 67 connected to a draw bar 66 and in a jaw carrier 64 to which each of a jaw 63 is attached by screw. A T-shaped projection member 65, 69 engages the T-slot 68, 70.

A face plate 71 is rigidly attached to the front end of the first body part 61 and covers the front of the chuck and has a series of work-engaging buttons 72 which engages an end face of a work-piece, as for example a pipe member 73.

As a result of the T-slot construction between the jaw carriers 64 and the plug 67, the jaw 63 will thus move axially inwardly until the work piece engages the stop buttons 72 provided on the face plate 71.

A clamping process of this construction is as follows. A rearward axial movement of the draw bar 66 by an air cylinder 74 and of the plug 67 will be accompanied by inward radial movement of the jaw carriers 64 relative to the outer body part 61 via the T-shaped projection member 65 in the T-slot 68.

As the inner body part 62 moves relative to the outer body part 61, a rear end face of the inner body part 62 abuts a spring 75 and compresses it. As a combination of the resistant force of the spring 75, T-shaped projection member 65 and the inclined T-slot 68 of the plug 67, jaw carriers 64 and the jaw 63 will thus move radially and inwardly to clamp the work piece.

Further rearward movement of the plug 67 causes rearward movement of the jaw carrier 64 and the inner body part 62, until the end face of a work-piece 73 engages the stop buttons 72. Then the axial movement of the jaw 63 is stopped and further pulling force by the air cylinder 74 is converted to a greater force to chuck the work piece tightly.

As described above, the conventional chuck construction consists of two main parts, the outer body part 61 which is secured to a spindle, and the inner body part 62 which is a movable part inside the outer body part. Consequently the whole body construction becomes big in its dimensions and the movable member causes an unstable condition when the chuck body rotates at a high speed.

Further, as the clamping force increases, a moment in the jaw carrier 64 also increases, which is bourne only by the T-slot 70 of the inner body part 62 and the T-shaped projection member 65 of the jaw carrier 64, the whole chuck body must be designed big in its dimensions to provide a durable rigidity to the chuck body.

The invention has been developed to solve the drawbacks of the conventional chuck construction, and it is an object of the invention to provide a compact chuck construction, by omitting the axial movement parts, which are inevitable in the conventional chuck construction.

DISCLOSURE OF THE INVENTION

A chuck body of this invention comprises axially movable plungers and jaws, in which said jaw has a master jaw body obliquely arranged with respect to the axis of the chuck body, said plunger receiving a bushing which acts as a wedge means cooperating with the master jaw body, a driving means at the rear end of the master jaw body, said jaw having a front face of the master jaw body and a rear end face of a master jaw head for restricting a position of the jaw with respect to the chuck body, being restricted to a backward movement within a range of a gap δ, said wedge means having a structure of canceling a moment applied to the jaw as a result of clamping and the driving means providing a reactant force to the master jaw body for canceling the drawing force applied to the plunger.

A part of the plunger receiving the bushing is supported by a cylindrical part of the chuck body, and the bushing and the master jaw body can be rotatable with respect to the axis of the chuck for reversing the clamping direction of the chuck. The driving means may be a coil spring disposed at the rear end of the master jaw body, and the sectional shape of the master jaw body and the bushing are circular.

A chuck body construction of this invention comprises axially movable plungers and jaws, in which said jaw has a T-shaped master jaw body obliquely arranged with respect to the axis of the chuck body, said plunger has a T-shaped groove cooperating with the master jaw body to form a wedge means, a driving means at the rear end of the chuck body, said jaw has a front face of the master jaw body and a rear end face of a master jaw head for restricting a position of the jaw with respect to the chuck body, being restricted to a backward movement within a range of a gap 6, and said wedge means has a structure of canceling a moment applied to the jaw as a result of clamping and the driving means providing a reactant force to the master jaw body for canceling the drawing force applied to the plunger.

The outer periphery of the plunger of the wedge means is supported by a cylindrical rear part of the chuck body and the driving means comprising a coil spring disposed in a housing of the rear end of the chuck body.

The other construction of a chuck body of this invention comprises axially movable plungers and jaws, in which said jaw having a master jaw body obliquely arranged with respect to the axis of the chuck body, said plunger having a through hole for a bushing cooperating with the master jaw body to form a wedge means, a driving means at the rear end of the chuck body, said jaw having a front face of the master jaw body and a rear end face of a master jaw head for restricting the position of the jaw with respect to the chuck body, being restricted in a backward movement within a range of a gap δ, said wedge means having a structure of canceling a moment applied to the jaw as a result of clamping and the driving means providing a reactant force to the master jaw body for canceling a drawing force applied to the plunger.

The sectional shape of the master jaw body is round and has flat surfaces at both upper and lower sides thereof, the driving means comprises an elastic member disposed at rear end of the master jaw body with a space and a groove disposed on a surface of a rear plate of the chuck body and the shape of the bushing includes a column and the section is a circle.

PREFERRED EMBODIMENT OF THE INVENTION

A preferred embodiment of the invention is now described with reference to the attached figures.

An embodiment 1 of the invention will be explained with reference to FIGS. 1 to 3.

Figure 1:
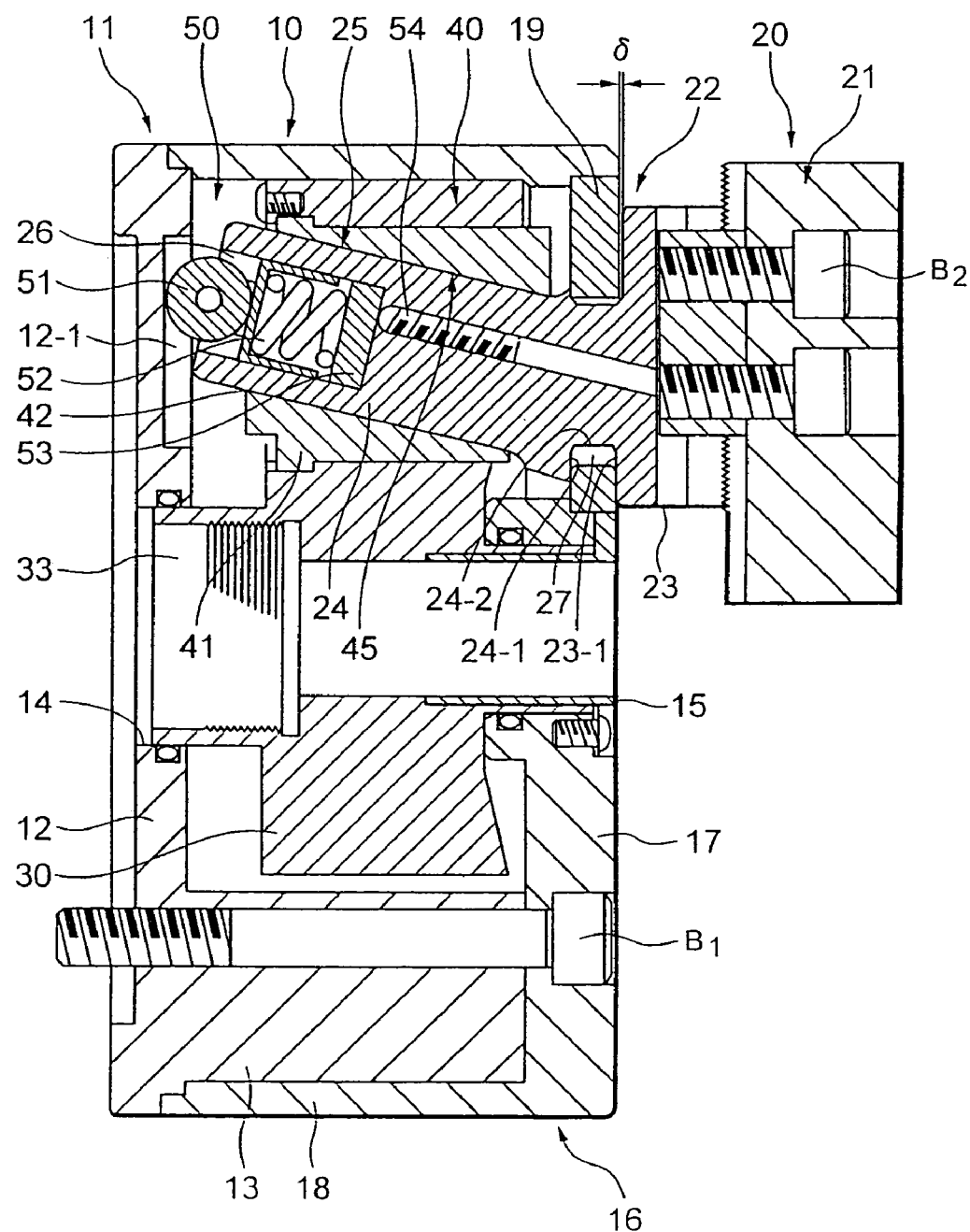
FIG. 1 is a sectional view of a chuck according to the invention.

FIG. 1 is a sectional view of a chuck body according to the invention. FIG. 2 is an exploded perspective view of a rear body part 11 and a front body part 16 consisting of a chuck body 10, and FIG. 3 is an exploded perspective view of a bushing 41 and a plunger 30 which make up a wedge means 40.

Figure 2:
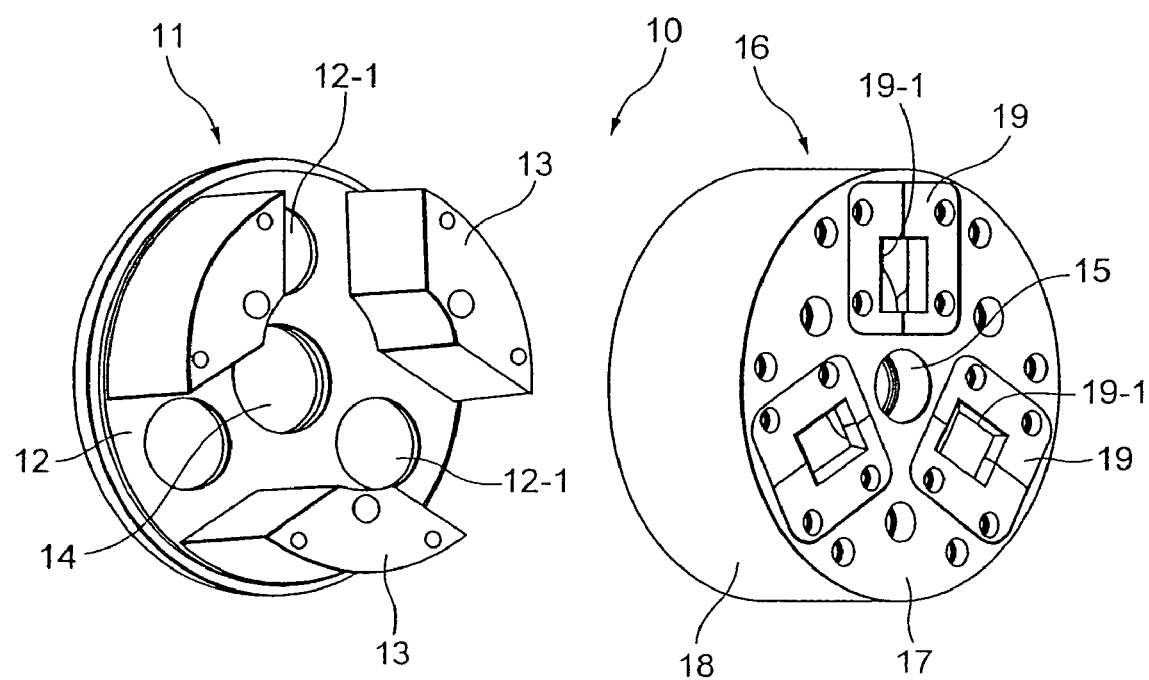
FIG. 2 is an exploded perspective view of the chuck of FIG. 1.

It may be clear as shown in FIGS. 1 and 2, the illustrated chuck body 10 includes a rear body part 11 and a front body part 16. Three main bodies 13-13 of the rear body part 11 engage with cylindrical housing part 18 of the front body part 16. The chuck body 10, including the rear body part and the front body part, is fixed to a spindle (not shown) with for instance three bolts $B_1$.

A plunger 30 is mounted in support holes 14, 15 which are formed in a rear plate 12 of the rear body part 11 and a front end plate 17 of the front body part 16 and a draw bar connector is formed at the end of the plunger 30 to which a draw bar (not shown) actuated by an air cylinder as usual is connected to actuate the plunger 30.

Figure 3:
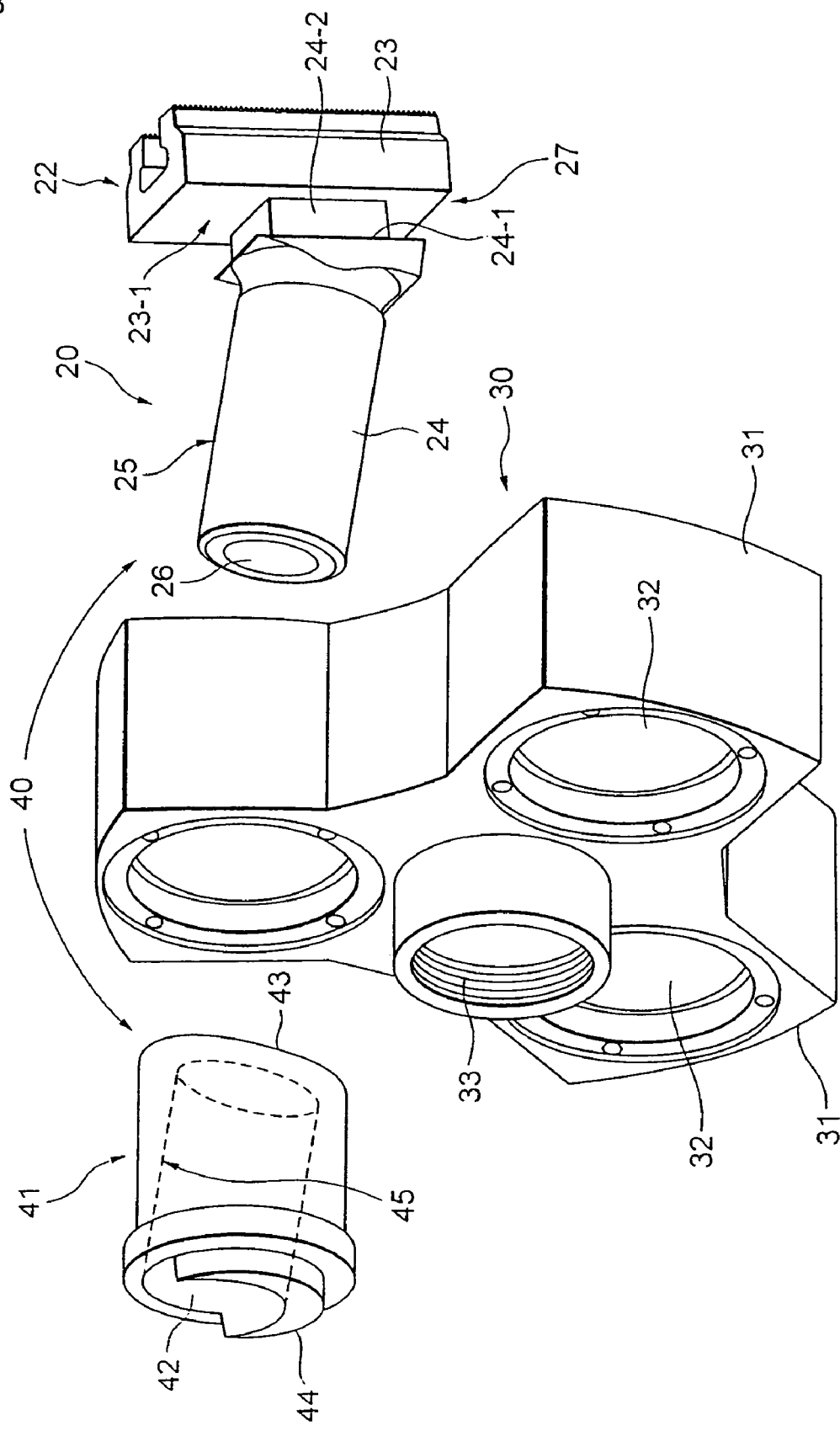
FIG. 3 is an exploded perspective view of the jaw and the bushing consisting of a wedge means of FIG. 1.

As illustrated in FIG. 3, the plunger 30 has three wedge supports 31 having support holes 32, 32 in which a bushing 41, one of the main parts of the wedge means 40 is located. The wedge support 31 is assembled with the rear body part 11 being placed in the spaces between the three main bodies 13, 13 as shown in FIG. 2.

The jaw 20 has a well-known structure, such as top jaw 21 is movably mounted in an axial direction on a master jaw head 23 of a master jaw 22 with bolts $B_2$, $B_2$.

A construction of the master jaw 22 is one of the main features of this invention in which a master jaw comprises the master jaw head 23 having a front face parallel to the clamping direction of a work and a cylindrical master jaw body 24 having a jaw neck 24-2 extending obliquely and outwardly with respect to the axis of the chuck body.

There is provided a recess 27 between the master jaw head 23 of the master jaw 22 and the master jaw body 24 for engagement. As illustrated in FIGS. 1 and 3, a rectangular neck 24-2 is disposed between a rear end face 23-1 of the master jaw head 23 and a front end face 24-1 of the master jaw body 24, providing a recess 27 and as illustrated in FIG. 1 and FIG. 2, openings 19-1, 19-1 of liners 19, 19 engage the recesses 27, 27. The liners consist of a pair of plates having openings.

A housing 26 for a driving means 50 is provided at the rear end of the master jaw body 24. A driving means 50 comprises a roller 51, a coil spring 52 and a bottom plate 53 and adjusts the driving force exerted from a rear plate 12 to the master jaw body 24 by screwing an adjust screw 54. There is provided a recess 12-1 at the point of roller 51 abutting a rear plate 12 for stable driving means.

As illustrated in FIG. 1, the width of the recess 27, that is, the distance between the rear end face 23-1 of the master jaw head 23 and the front end face 24-1 of the master jaw body 24 of master jaw neck 24-2, is larger by δ than the thickness of the liner 19 which engages the neck 24-2 at the recess 27. A detailed purpose of 5 will be explained later, but in this embodiment, 6 is preferably 0.5 mm.

As illustrated in FIGS. 1 and 3, a bushing 41, a main part of a wedge mean 40, having a cam hole 42 extending obliquely with respect to the axis of the chuck body, from the front end 43 to rear end 44 of the bushing. The oblique angle of the cam hole 42 and the oblique angle of the master jaw body 24 coincide therefore a camming function is obtained by the camming faces 25, 45 and consequently wedge means work as a wedge.

In this embodiment, the bushing 41 is arranged as the cam hole 42 extends obliquely and outwardly with respect to the axis of the chuck body, but in case the direction of clamping is opposite, the bushing 41 will be turned upside-down in the support hole 32 of the plunger 30, and the cam hole 42 extends obliquely and inwardly with respect to the chuck axis. In this case, the rear end of the master jaw body 24 of master jaw 22 is arranged to extend obliquely and inwardly with respect to the chuck axis.

An embodiment 2 of the invention will be explained with reference to FIGS. 4 to 6.

Figure 4:
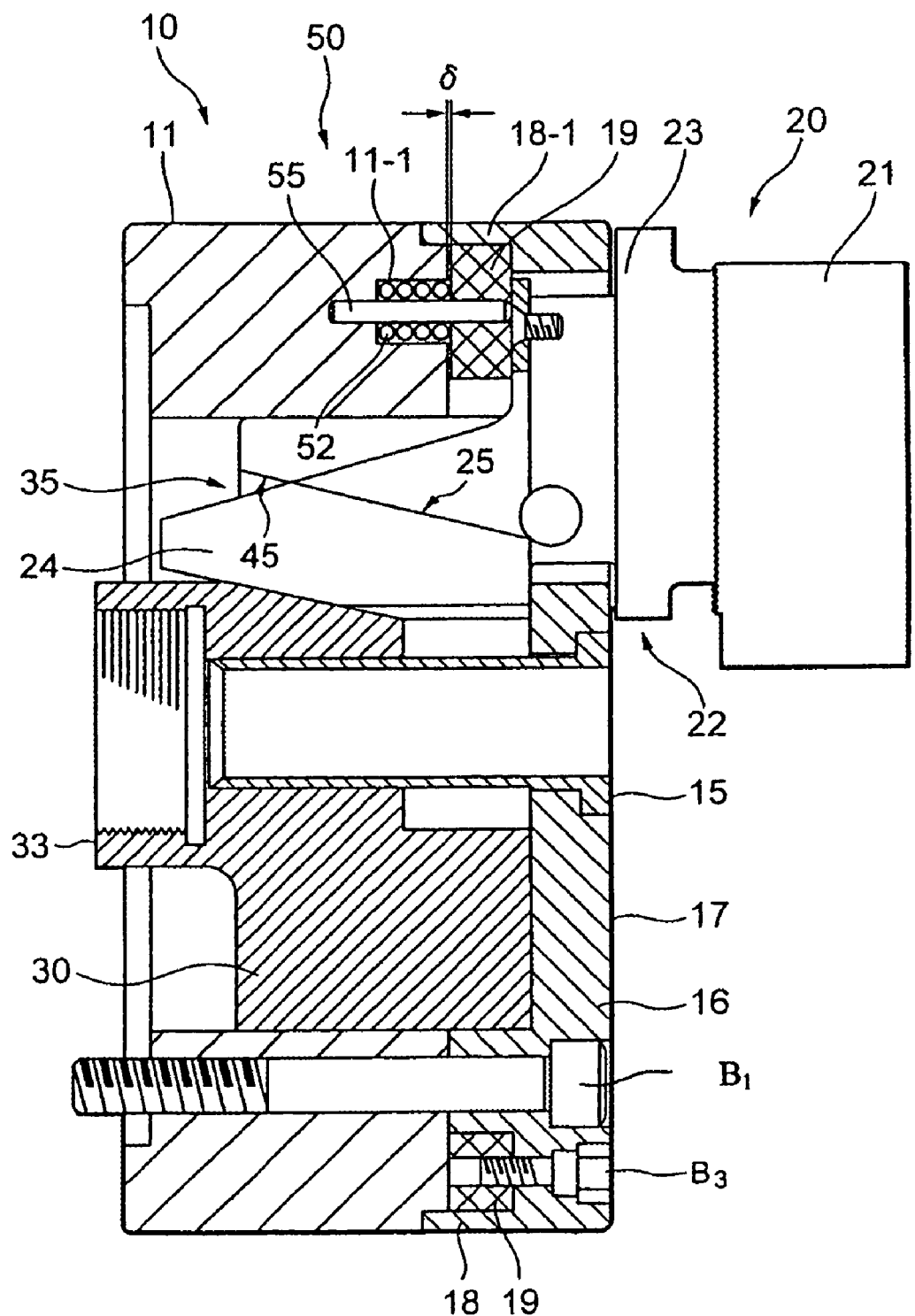
FIG. 4 is a sectional view of another embodiment of the invention.
Figure 5:
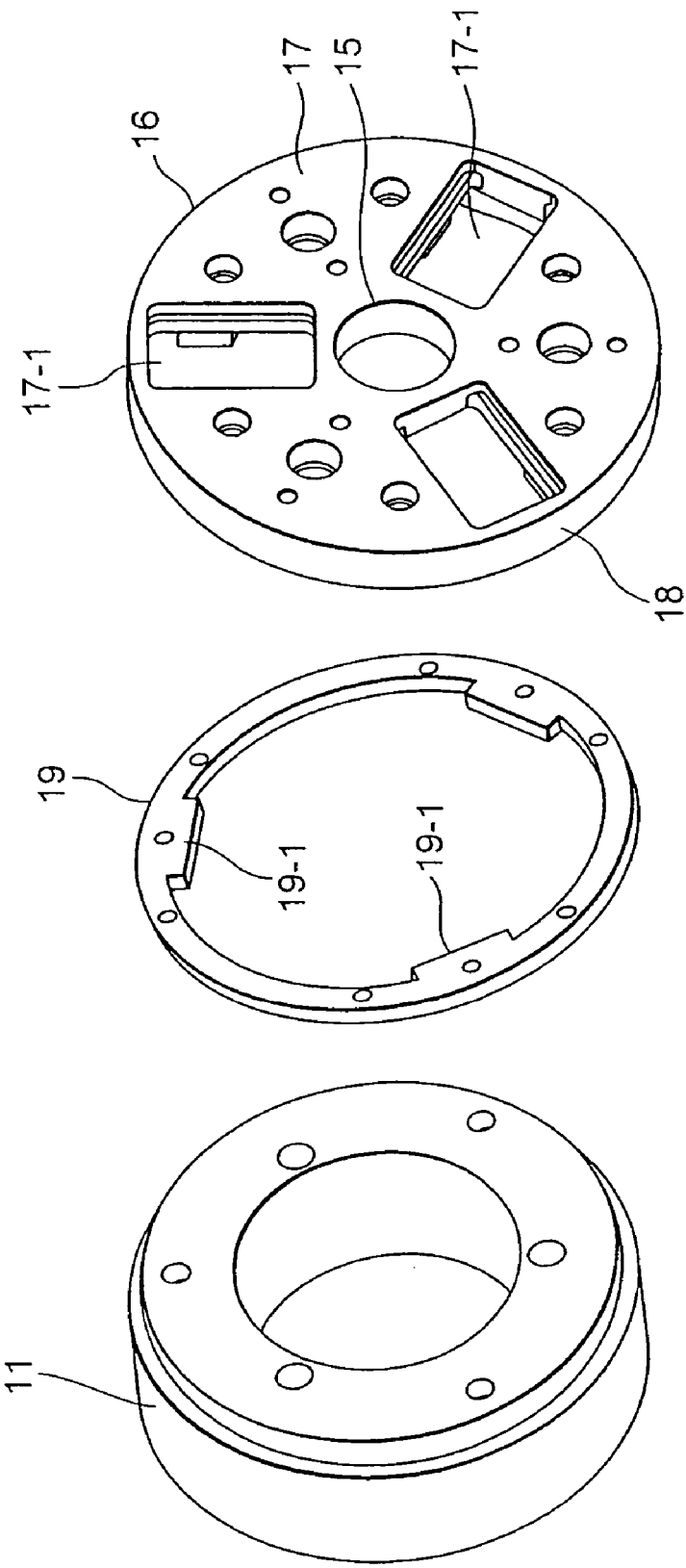
FIG. 5 is an exploded perspective view of the chuck of FIG. 4.
Figure 6:
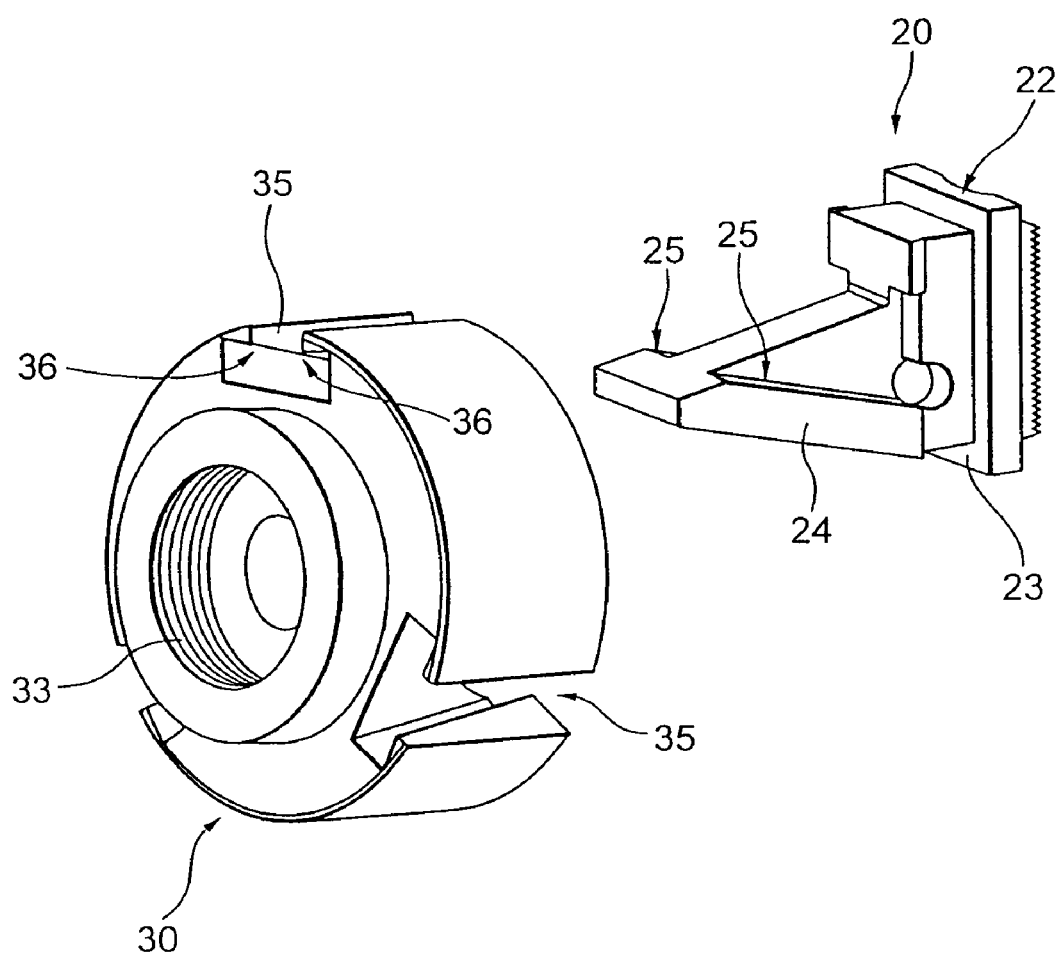
FIG. 6 is an exploded perspective view of the plunger and the jaw of FIG. 4.

FIG. 4 corresponds to FIG. 1 and is a sectional view of a chuck body 10 of embodiment 2, FIG. 5 is a perspective view of a separately drawn rear body part 11, a front body part 16 and a liner 19 consisting of a chuck body 10, and FIG. 6 illustrates a perspective view of a plunger 30 and a jaw 20. An arrangement of a chuck body 10 and a liner 19 is clearly illustrated in FIGS. 4 and 5.

A rear body part 11 consisting of a chuck body 10 is a cylindrical block, assembled with a liner 19 between a front body part 16 and a cylindrical housing part 18 and a rear body part 11 and a front body part 16 are fixed to a spindle (not shown) of a lathe or the like with three bolts $B_1$.

The liner 19 is an annular ring having wider parts 19-1, 19-1 where driving forces are applied.

As illustrated in FIGS. 4 and 6, the plunger 30 of this embodiment has three T-shaped cam guide grooves 35 at the periphery of the plunger 30. Both sides of the dam guide groove 35 have camming surfaces 36, 36 for engaging camming surfaces 25, 25 of the master jaw 20 and form a wedge means 40, like the camming surface 45 of the bushing 41 explained in embodiment 1. The camming surfaces 36, 36 extend obliquely with respect to the axis of the chuck toward the rear part of the chuck.

A draw-bar connector 33 is formed at the center of the plunger 30. A hole 15 for mounting a chip guard cover (not shown) is disposed at the center of the front body plate 17. The chip guard cover prevents intrusion of the cutting chips from the work into the chuck body.

As clearly illustrated in FIG. 6, the jaw 20 comprises a top jaw 21 and a master jaw 22 having a master jaw head 23 and master jaw body 24. Master jaw body 24, having a T-shaped section, has camming surfaces 25, 25 which engage with camming faces 36, 36 of the plunger 30. The depth of the master jaw body 24 decreases toward the rear end.

As illustrated in FIG. 5, three openings 17-1 ... 17-1 for the master jaw are disposed at the front annular plate 17 of the front body part 16, and as illustrated in FIG. 4, most of the master jaw body 24 is received in the chuck body 10 through the opening 17-1. The liner 19 is inserted between the front surface of the rear body part 11 of the chuck body 10 and the front body part 16 and engages a notch 18-1 of the cylindrical housing part 18 of the front body part 16, therefore, the openings 17-1 ... 17-1 can be simple openings.

A driving means 50 is arranged between the rear body part 11 and the cylindrical housing part 18 as clearly shown in FIG. 4.

The liner 19 is inserted between the front surface of the rear body part 11 and a notch 18-1 of the cylindrical housing part 18 and the distance between the front surface of the rear body part 11 and the notch 18-1 is larger by δ than a thickness of the liner 19, like the embodiment 1, and δ is 0.5 mm.

A coil spring 52 for forcing the master jaw head 23 in the forward direction, is placed in a recess 11-1, and a guide pin 55 at the center of the coil spring 52 and a guide bolt $B_3$ provide stable back and forth movement of the liner 19 which pushes all the master jaws 22, 22 simultaneously. Each coil may contact and push directly the rear end face of the master jaw head 23.

An embodiment 3 of the invention will be explained with reference to FIGS. 7 to 10.

Figure 7:
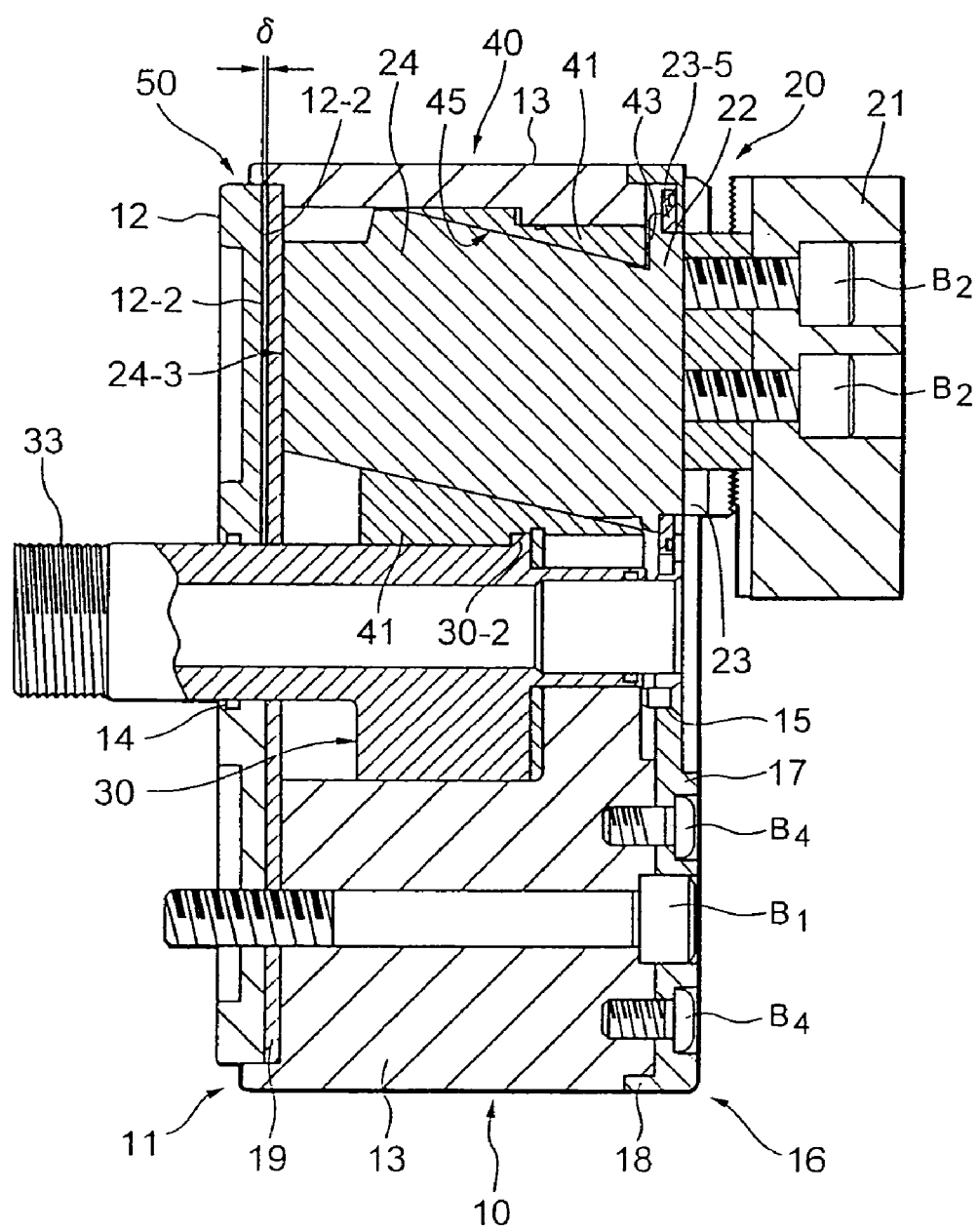
FIG. 7 is a sectional view of another embodiment of the invention.
Figure 8:
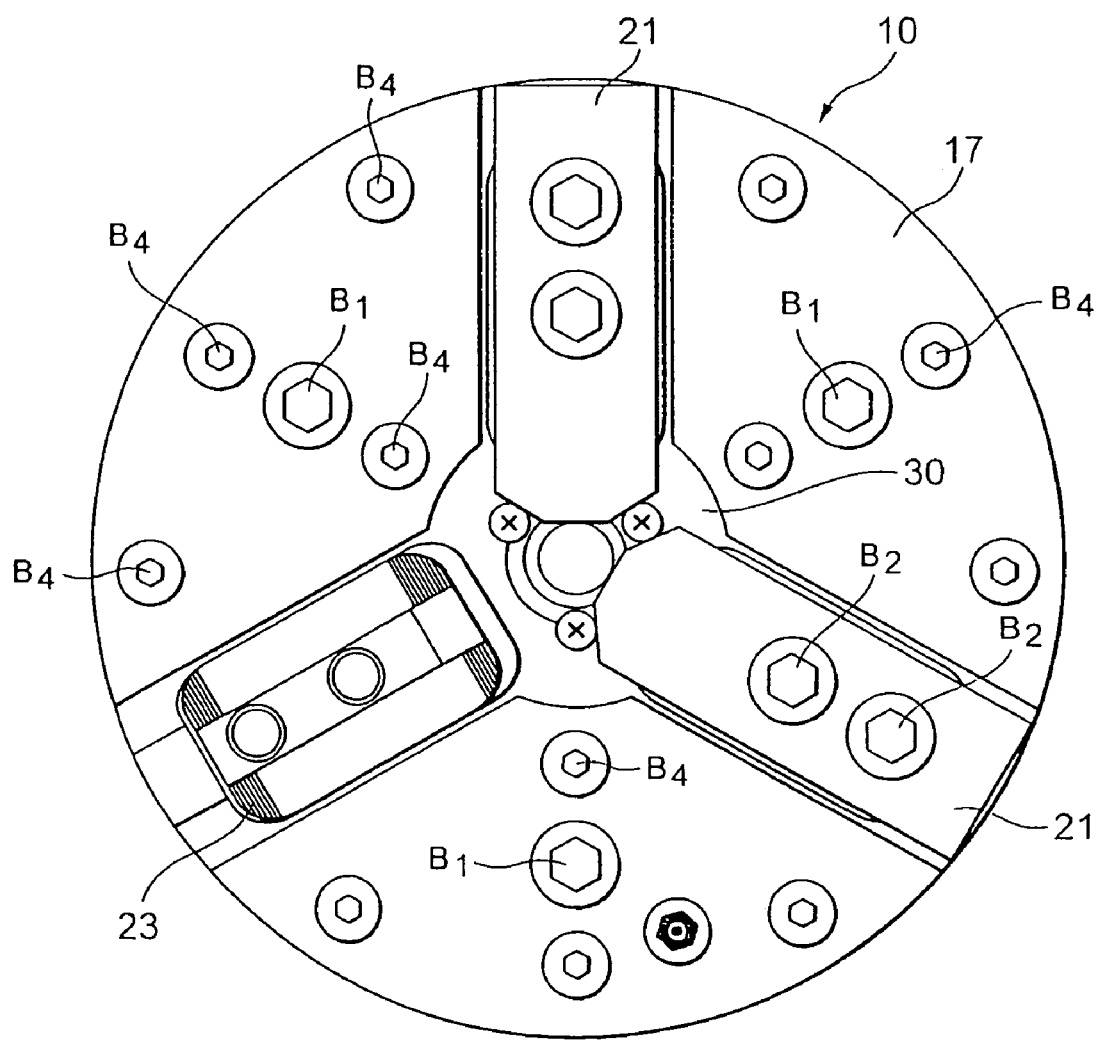
FIG. 8 is a front view of the chuck of FIG. 7.
Figure 9:
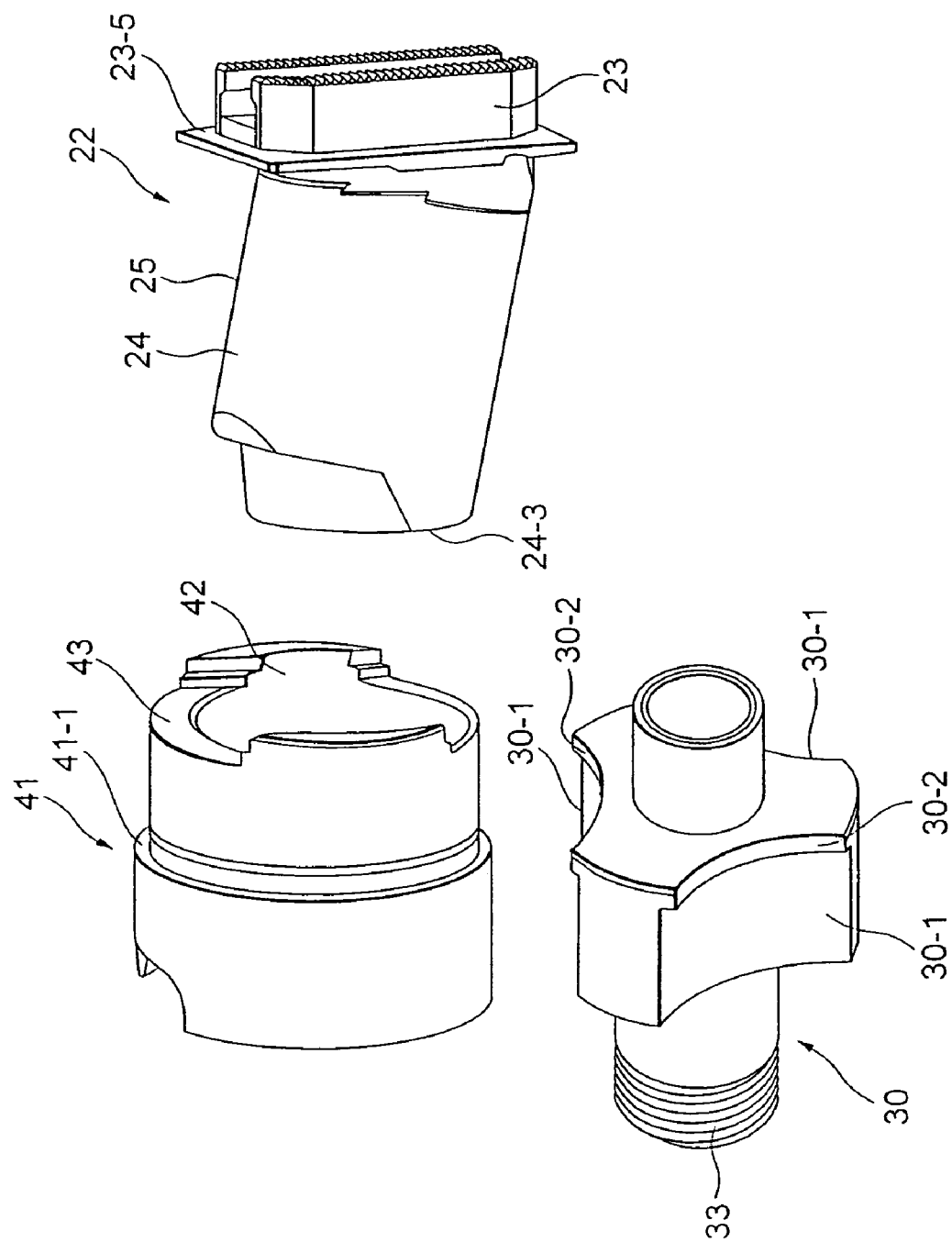
FIG. 9 is an exploded perspective view of the plunger and the bushing of FIG. 7.

FIG. 7 is a sectional view of a chuck body 10 of the embodiment 3. FIG. 8 is a front view of the embodiment. FIG. 9 is an exploded perspective view of the plunger 30, bushing 41 and the master jaw 22, and FIG. 10 illustrates an exploded view of a chuck body 10.

As illustrated in FIG. 7, a rear body part 11 of the chuck body 10 comprises an independent rear plate 12 and a main body 13 and a front body part 16 comprises a front annular plate 17 and cylindrical part 18. The front annular plate 17, the rear plate 12 and the main body 13 of the rear body part 11 are assembled together with bolts $B_4$, $B_4$. The front body part 16, the rear plate 12 and the main body 13 are connected to a spindle (not shown) with bolts $B_1$ ... $B_1$ with a driving means 50.

Figure 10:
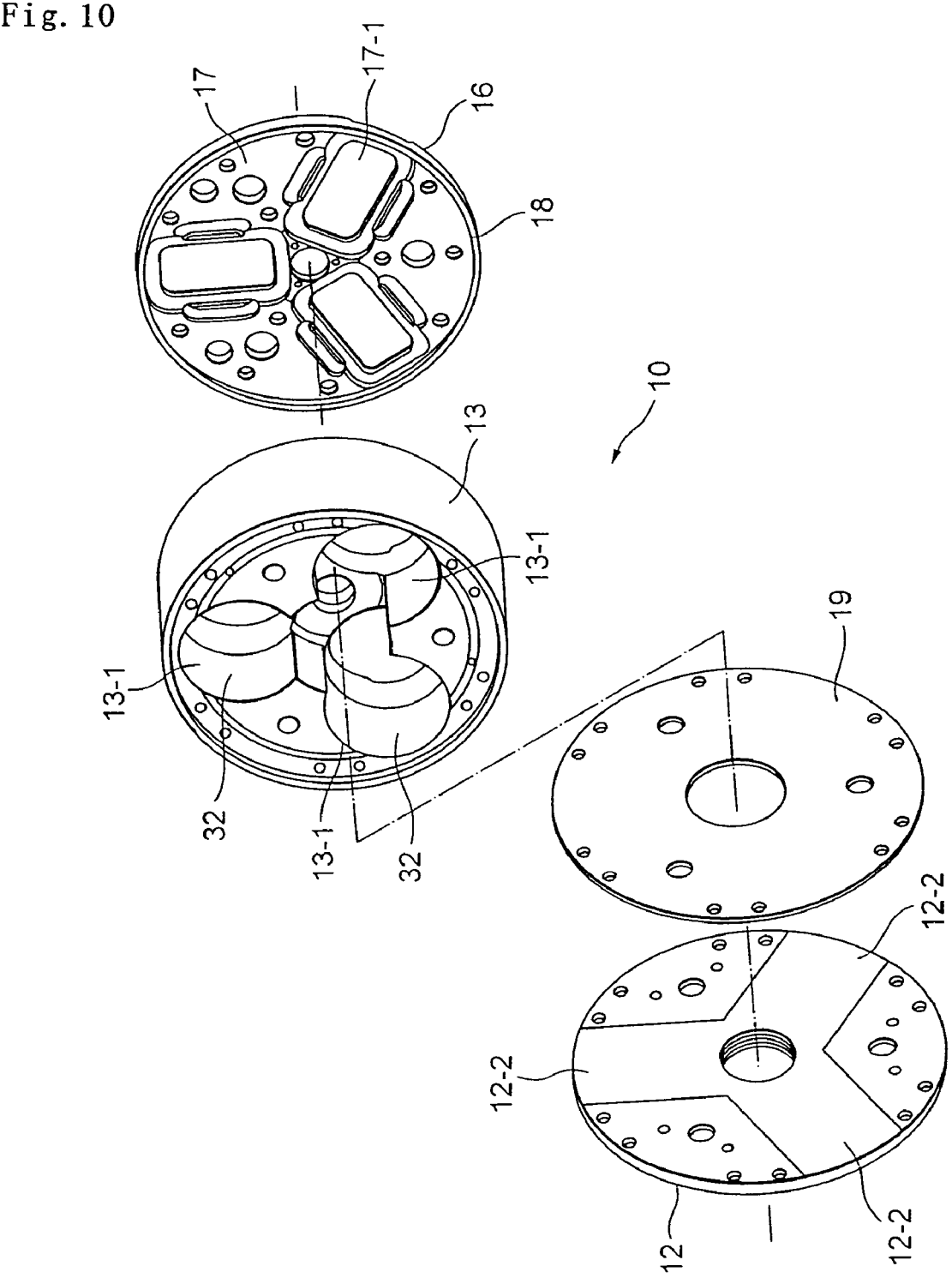
FIG. 10 is an exploded perspective view of a chuck body according to the invention disclosed in FIG. 7.

As illustrated in FIG. 9, three concave surfaces 30-1 ... 30-1 disposed around the plunger 30 form holes 32, 32 through the main body 13 cooperating with holes 13-1, 13-1 illustrated in FIG. 10 through which bushings 41 comprising a wedge means 40 are provided. Flanges 30-2 ... 30-2 disposed at the edges of the concave surfaces 30-1.30-1, engage an enlarged portion 41-1 disposed around the bushing 41 and a drawing force from a draw bar (not shown) is transmitted to the bushings 41 ... 41.

A jaw 20 of the embodiment 3 is generally the same construction of the embodiment 1 illustrated in FIGS. 1 to 3. A master jaw 22 has a cylindrical master jaw body 24 having a master jaw head 23 at its top to which a top jaw 21 is adjustably fixed with bolts $B_2$-$B_2$. A camming surface 25 of the master jaw body 24 for wedge means engages with a camming surface 45 of the bushing 41.

The master jaw 22 of this embodiment 3 is different from that of the embodiment 1 in the relationship between the master jaw head 23 and the master jaw body 24. As illustrated in FIGS. 7 and 9, the master jaw head 23 is directly connected to the master jaw body 24, and a limit plate 23-5 disposed around the master jaw head 23 define forward movement of the jaw 20 by abutting the limit plate to the front plate 17 of the chuck body 10. The rear end of the master jaw body 24 has a rear end face 24-3 perpendicular to the axis of the chuck, and the rear end face 24-3 and a liner 19 make up driving means 50.

As illustrated in FIG. 7, the chuck body 10 comprises a rear plate 12, a main body 13 and a front body part 16, a feature of this embodiment is that the liner 19 is disposed between the rear plate 12 and the main body 13, which is a rear part of the chuck body.

In FIGS. 7 to 10, as the liner 19 is disposed between the rear plate 12 and the main body 13, grooves 12-2 ... 12-2 are formed in the rear plate 12 corresponding to the rear end faces 24-3 ... 24-3 of the master jaw bodies 24. As illustrated in FIG. 7, a distance between the rear end face 24-3 of the master jaw body 24 and the face of the groove 12-2 is larger than the thickness of the liner 19 by δ, which is, in this case, 0.5 mm.

As shown in FIG. 7, in this embodiment, where the jaw 20 is not arranged, the rear body part 11, the rear plate 12 and the liner 19 are all solidly fixed together and there is no gap between the liner 19 and the rear plate 12. Normally the liner 19 abuts the rear end face 24-3 of the master jaw body 24, and the front part of master jaw head 23 abuts the front annular plate 17 of front body part 16. The camming face 25 of the main jaw body 24 and the camming face 45 of the bushing 41 consists of a wedge means 40 and works as a wedge.

Wedge means 40 comprises a camming surface 45 of the bushing 41 and camming surfaces 25 of the master jaw body 24 of master jaw 22. The angle of the main jaw body 24 and the bushing 41 with respect to the chuck axis is the same as the other embodiments already explained, and that the angle is dependent on the direction of the clamping, more specifically on clamping the work from the outside of the work or from the inside of the work.

FIG. 8 is a front view of the front plate 17; one of the master jaw head 23 indicated as one of the top jaw 21 is disconnected. Bolts $B_2$, $B_2$ are for fixing the top jaw 21 to the master jaw head 23, three bolts $B_1$ ... $B_1$ are for assembling the rear body part 11, the main body 13, the liner 19 and the front body part 16 together and for connecting the chuck body 10 to a spindle (not shown).

The bolt $B_4$, $B_4$ fixes the front plate 17 of the front body part 16 to the main body 13.

A feature of this embodiment is indicated in FIGS. 9 and 10, in which the main body 13 of the chuck body 10 has holes 13-1 . . . 13-1, defining outer parts of the holes 32 which receive a bushing 41 . . . 41, and as shown in FIG. 9, three concave surfaces 30-1 . . . 30-1 of the plunger 30 defining inner parts of the holes 32 of the wedge means 40.

The wedge means 40 comprises the camming surfaces 45 . . . 45 of the bushings 41 . . . 41 and the camming surfaces 25 . . . 25 of the master jaw body 24.24 and the holes 32 comprising holes 13-1 . . . 13-1 of the main body and the three concave surfaces 30-1, 30-1 of the plunger 30.

The plunger 30 transmits the drawing force from the draw bar via the flanges 30-2 . . . 30-2 disposed at the edge of the three concave surfaces 30-1 . . . 30-1 to the wedge means 40.

Now according to FIG. 11 and referring to FIG. 7, the clamping process of the chuck body will be explained.

It should be noted that the mechanical relationship of each member of the chuck body is generally the same in other embodiments according to the invention.

Figure 11:
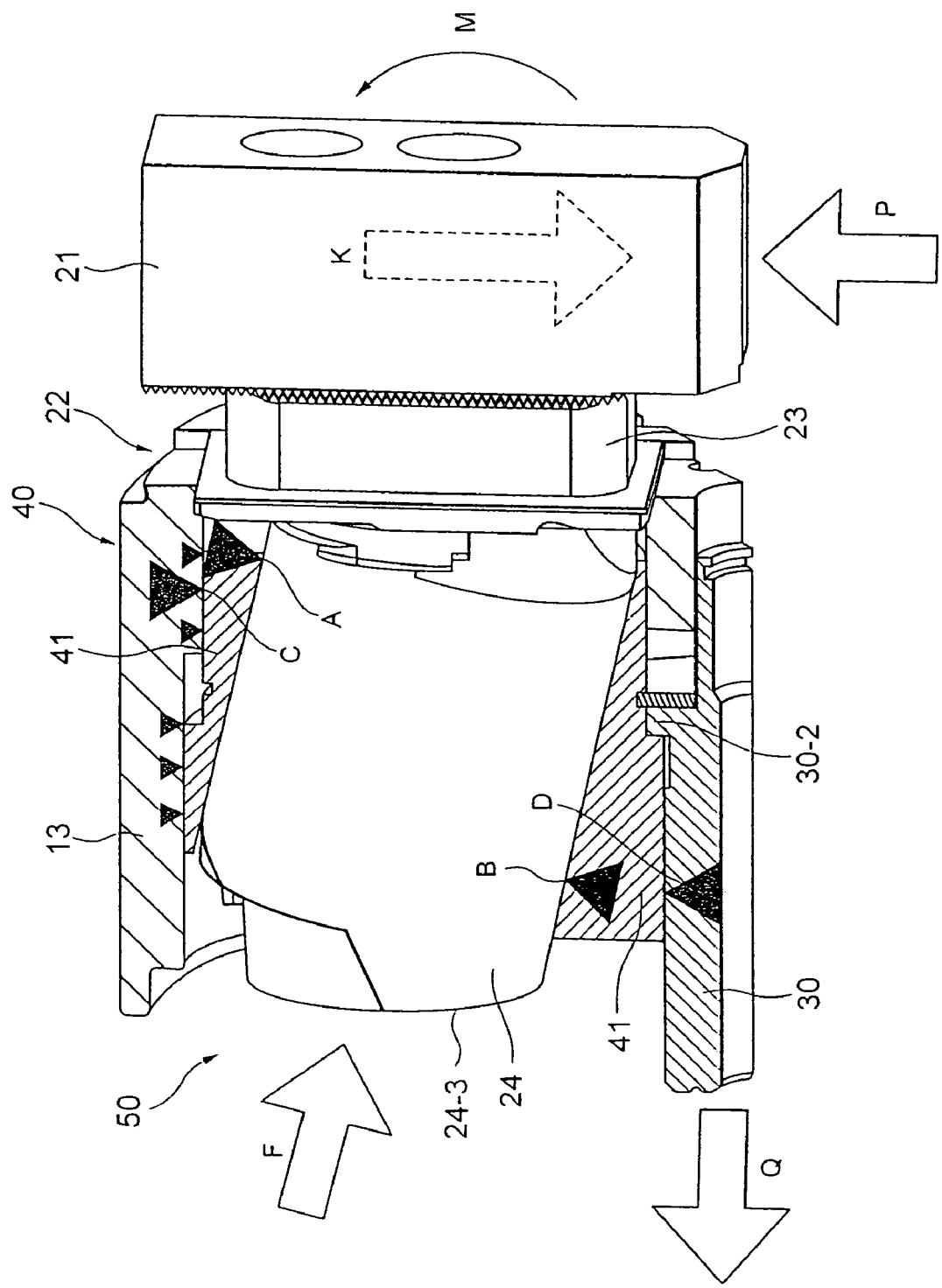
FIG. 11 is a view of the chuck of FIG. 7 for explaining a clamping process.

As shown in FIG. 11, clamping will be started when the draw bar (not shown) draws the plunger 30 in the direction indicated as an arrow "Q". Then the three flanges 30-2 . . . 30-2 of the plunger 30 engaging the enlarged portion 41-1 of the bushing 41 transmit the drawing force to the bushing 41 and the bushings 41 . . . 41 slide in a backward direction.

Each camming face 25 of the master jaw body 24 engaging the camming face 45 of the bushing 41 simultaneously moves backward of the axis of the chuck, more specifically, in the backward direction of the axis of the master jaw body 24.

On the other hand, it is clear from the structure illustrated in FIG. 7, as the rear end face 24-3 of the master jaw body 24 abuts the liner 19, consisting of the driving means 50, a reactant force "F" directed in a forward direction of the axis of the master jaw body 24, and the friction force between the contacting camming faces, the wedge means does not start moving in the backward direction immediately. Consequently, each master jaw body 24 . . . 24 receives a forward directing force of the axis of the chuck and the top jaw 21 moves inwardly depending on the distance the plunger 30.

Inward movement of the top jaws 21 . . . 21 causes a clamping reactant force (P) from the work (not shown).

Further, as the drawing force Q of the plunger 30 increases, the clamping force (K) of the top jaw 21 and the reactant force P also increase. A moment (M) rotating the jaw 20 as a whole is generated and consequently reactants for canceling the moment (M) are generated at positions indicated at A and B of the camming face 25 of the master jaw body 24.

The master jaw body 24 is supported at the positions A and B by the camming surface 45 of the bushing 41.

As the clamping force (K) of the top jaw 21 and the reactant force (P) increase and the master jaw body 24 cannot move forward, then a reactant backward force applied to the master jaw body 24 increases. The reactant force is cancelled by a reactant force generated by a deflection of the liner 19 which might be smaller than the gap δ between the liner 19 and the groove 12-2 of the rear plate 12. A further drawing force of the plunger 30 provides a predetermined clamping force (K) to the jaw 20, the deflection of the liner 19, that is the backward movement of the master jaw body 24 is almost the same or smaller than gap δ between the rear face of the liner 19 and the groove 12-2 of the rear plate 12.

The moment (M) is applied to the top jaw 21 as the clamping by the top jaws 21, 21, 21 starts like the conventional chuck, the top of the top jaw 21 and the work tend to move forward from the start point of the clamping. But according to the invention, the liner 19 is allowed to deflect backward by the backward reactant force from the master jaw body 24, the work stays at a predetermined position and contacts an engaging button (not shown) disposed at the surface of the chuck face. At this point, the drawing force (Q) of the plunger 30 and the reactant force (F) from the driving means 50 are balanced.

The important point of this invention is that the reactant force at the position A and B preventing the rotation of the master jaw body 24 is supported by the bushing 41 per se, but is also supported at the position C and D of the plunger 30.

The clamping force (K) is supported by the whole body of the chuck and cancels the moment applied to the jaw 20, therefore the work is prevented from movement and is positioned at a predetermined position. The chuck according to the invention provides enough of a clamping force with a small dimension of the chuck.

Figure 12:
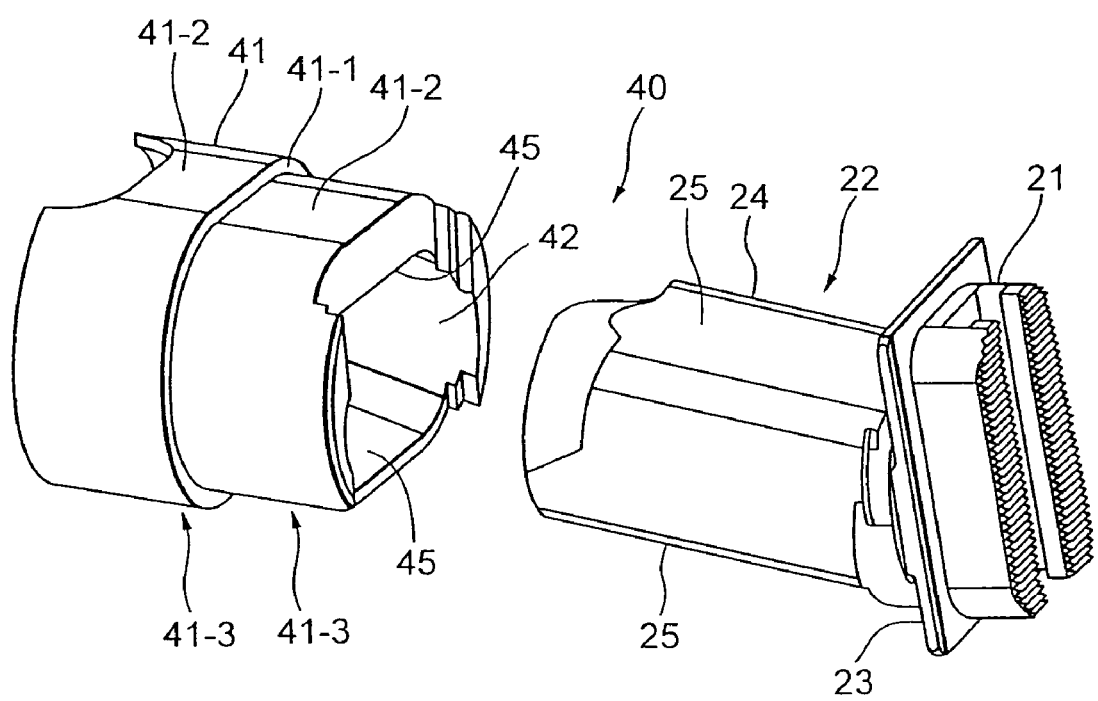
FIG. 12 is a perspective view of a bushing and a jaw consisting of the wedge means.

FIG. 12 illustrates another embodiment of the wedge 40 of this invention, more specifically illustrates a construction of a bushing 41 and a master jaw 22. The bushing 41 is a cylindrical member having flat surfaces 41-2, 41-3 at upper and lower sides. The bushing 41 is placed in a hole 32 as illustrated in FIG. 3 or 10, corresponding holes 32 will be designed to receive bushings 41 having the same shape.

A sectional figure of a master jaw body 24 of a master jaw 22 corresponds to a section of a camming hole 42 of the bushing 41. The hole 42 has upper and lower flat camming faces 45, 45 and the master jaw body 24 has corresponding flat camming faces 25, 25 at it's upper and lower end. The bushing 41 and master jaw 22 of this embodiment may be assembled with the other construction of the chuck body illustrated in FIGS. 7 to 11.

Figure 13:
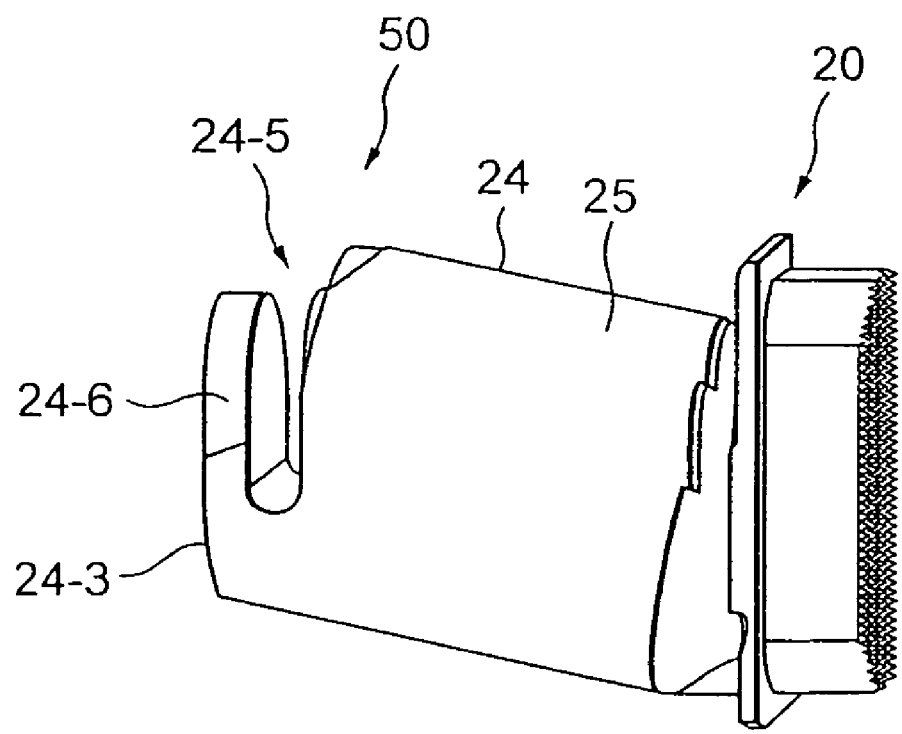
FIG. 13 is a perspective view of the jaw related to the driving means of another embodiment.
Figure 14:
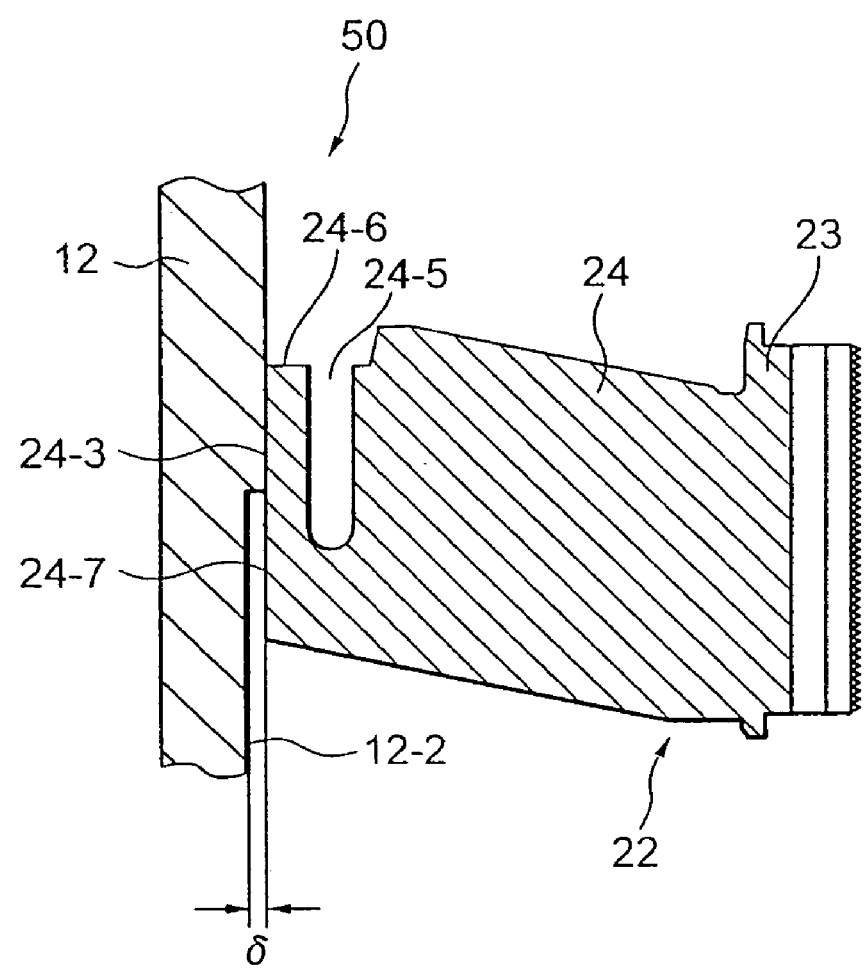
FIG. 14 is a sectional view of the jaw of FIG. 13.

FIGS. 13 and 14 illustrate another embodiment of a driving means 50 applied to the chuck body, for instance, the one illustrated in FIG. 7. The driving force will be generated based on a relationship between a rear plate 12 and a master jaw body 24 as with the other embodiments explained previously.

As illustrated in FIG. 13, the liner 19 is omitted in this embodiment and a construction for generating a driving force is involved in the construction of the master jaw body 24.

There is provided an elastic member 24-6 at the rear end of the master jaw body 24 with a space 24-5. The rear plate 12, as illustrated in FIG. 14, has a groove 12-2 at a lower portion where the master jaw body 24 contacts, whereby a gap δ is formed between the rear end face of the master jaw body 24 and the rear plate 12.

The elastic member 24-6 of the master jaw body 24 and the space 24-5 provides an initial driving force to the jaw, and the gap allows a backward movement of the master jaw body 24 until the rear end face of the master jaw body 24 contacts the groove 12-2 of the rear plate 12.

Figure 15:
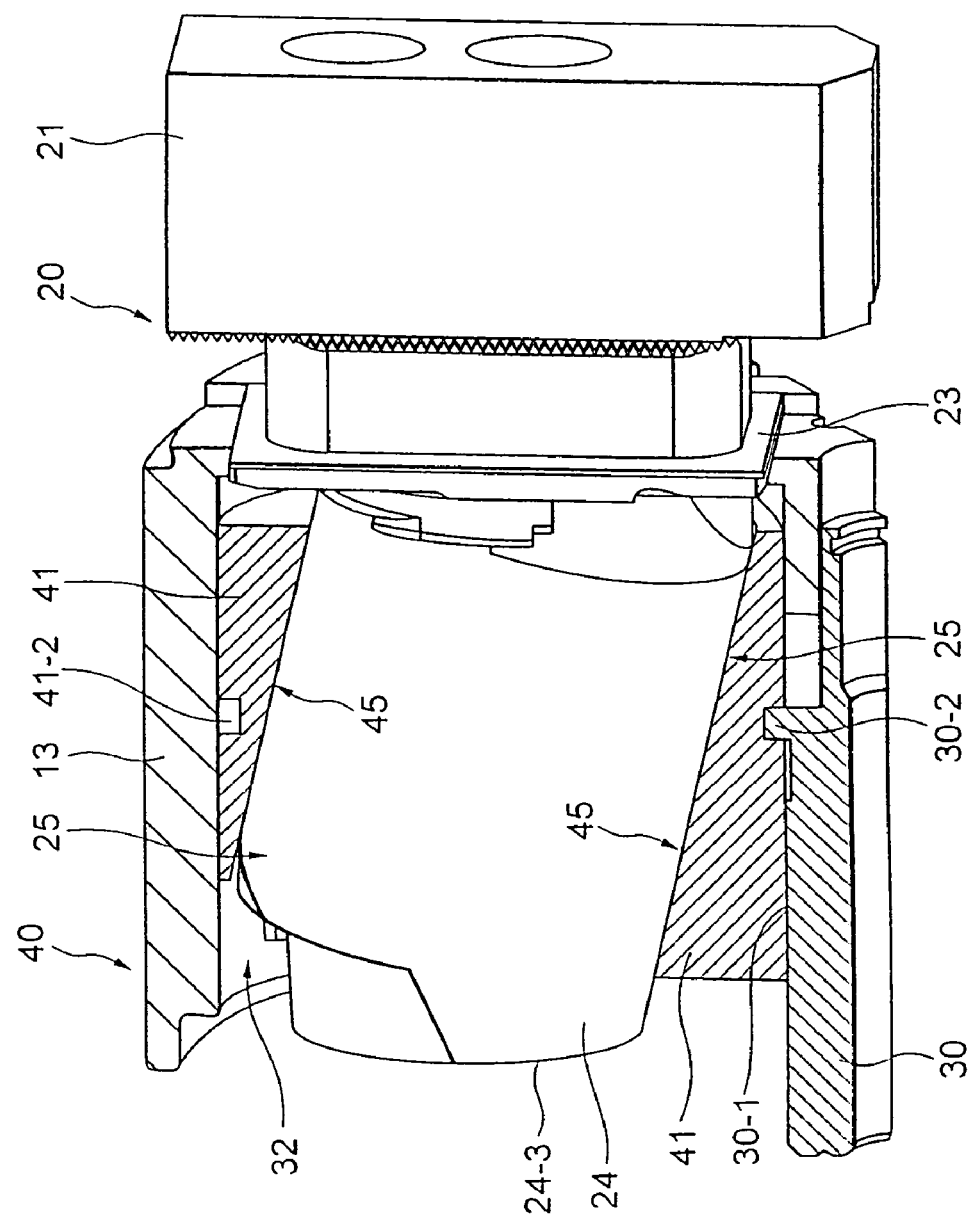
FIG. 15 is a perspective view and partly a sectional view of a wedge means.
Figure 16:
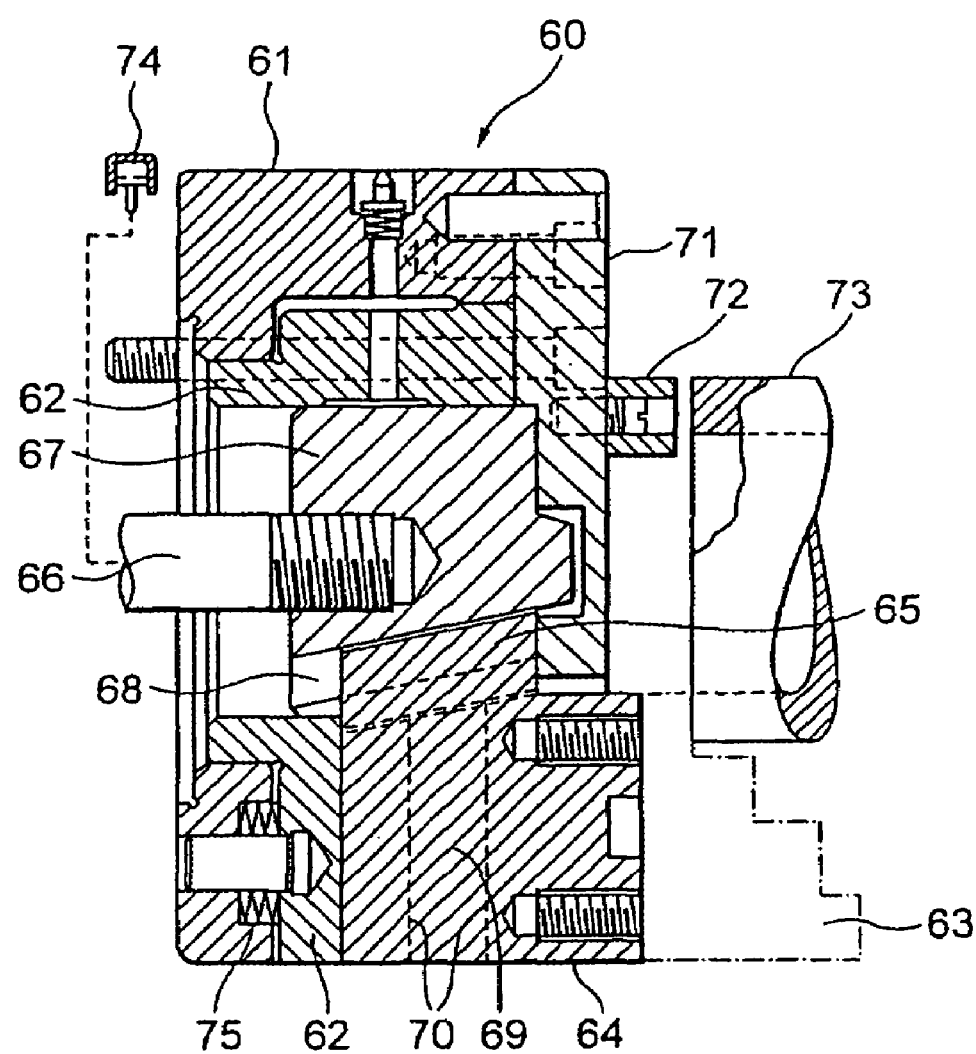
FIG. 16 is a sectional view of a chuck according to the prior art.

FIG. 15 illustrates another construction of the bushing 41, the main body 13 and the plunger 30 of the wedge means 40 illustrated in FIGS. 7 to 11.

The feature of this embodiment is that the bushing 41 has no enlarged portion as indicated in FIG. 7, therefore the shape of the bushing 41 is a complete circle and the corresponding hole 32 of the main body 13 (or the cylindrical part 18) receiving the bushing 41 is also a circle in shape with the groove 30-1 of the plunger 30. The plunger 30 engages the groove 41-2 of the bushing 41 with the flange 30-2.

INDUSTRIAL APPLICABILITY

The invention has made possible to omit the parts, which moves in the axial direction and provides a compact chuck construction. Consequently, a dynamic balance of the chuck at a high-speed operation is improved and the construction of the chuck body becomes compact in size because the moment at the jaw caused by the clamping force is supported by the plunger and the chuck body, which consist of the wedge means.

What is claimed is:

1. A chuck body comprising an axially movable plunger and jaw, said jaw having a master jaw body obliquely arranged with respect to an axis of the chuck body, said plunger receiving a bushing which acts as a wedge means cooperating with the master jaw body, a driving means disposed at a rear end of the master jaw body for forcing the master jaw body in a forward direction, said jaw having a front face of the master jaw body and a rear end face of a master jaw head for restricting a position of the jaw with respect to the chuck body and is restricted in rearward movement within a range of a gap $\delta$, said jaw having a movement guided to an inside direction of the chuck body of the jaw by the front face of the master jaw body and a front end plate of the chuck body, said wedge means having a structure for canceling a moment applied to the jaw as a result of clamping and the driving means providing a reactant force to the master jaw body for canceling a drawing force applied to the plunger, wherein said jaw is constrained to be drawn radially inward in a direction perpendicular to the axis of the chuck body in a first movement in response to an axial movement of the plunger and a wedging action of the master jaw body and in a rearward direction parallel to the axis of the chuck body in a second movement.

2. The chuck body of claim 1, wherein a part of the plunger receiving the bushing is supported by a cylindrical part of the chuck body.

3. The chuck body of claim 1, wherein the bushing and the master jaw body are rotatable with respect to the axis of the chuck for reversing the clamping direction.

4. The chuck body of claim 1, wherein the driving means comprises a coil spring disposed at the rear end of the master jaw body.

5. The chuck body of claim 1, wherein a sectional shape of the master jaw body and the bushing is a circle.

6. The chuck body of claim 1, wherein a sectional shape of the master jaw head is a circle having flat surfaces at both upper and lower sides thereof.

7. A chuck body comprising an axially movable plunger and jaw, said jaw having a T-shaped master jaw body obliquely arranged with respect to the axis of the chuck body, said plunger having a T-shaped camming groove cooperating with the master jaw body to form a wedge means by camming surfaces of the master jaw body and camming surfaces of plunger cam guide grooves, a driving means disposed at a rear end of the chuck body for moving the master jaw body in a forward direction, said jaw being restricted in rearward movement within a range of a gap $\delta$ at a rear end face of a master jaw head and a front face of a rear body part of the chuck body, said jaw having a movement guided to an inside direction of the chuck body of the jaw by a front face of the master jaw body and a front end plate of the chuck body, said wedge means having a structure for canceling a moment applied to the jaw as a result of clamping and the driving means providing a reactant force to the master jaw body for canceling a drawing force applied to the plunger, wherein said jaw is constrained to be drawn radially inward in a direction perpendicular to the axis of the chuck body in a first movement in response to an axial movement of the plunger and a wedging action of the master jaw body and in a rearward direction parallel to the axis of the chuck body in a second movement.

8. The chuck body of claim 7, wherein a periphery of the plunger of the wedge means is supported by a cylindrical part of the rear body part of the chuck body.

9. The chuck body of claim 7, wherein the driving means comprises a coil spring disposed in a housing of a rear end of the chuck body.

10. A chuck body comprising axially a movable plunger and jaw, in which said jaw having a master jaw body obliquely arranged with respect to an axis of the chuck body, said plunger forming a part of a through hole for a bushing cooperating with the master jaw body and also having flanges to engage a bushing to form a wedge means, said chuck body having a through hole for a bushing which comprises the wedge means, a driving means disposed at a rear end of the chuck body for moving the master jaw body in a forward direction, said jaw having a limit plate at the master jaw body and a rear end face of a master jaw head for restricting a position of the jaw with respect to the chuck body and is restricted in rearward movement within a range of a gap $\delta$, said jaw having a movement guided to an inside direction of the chuck body of the jaw by a front face of the master jaw body and a front end plate of the chuck body, said wedge means having a structure for canceling a moment applied to the jaw as a result of clamping and the driving means providing a reactant force to the master jaw body for canceling a drawing force applied to the plunger, a reactant force to the bushing being supported by said chuck body, wherein said jaw is constrained to be drawn radially inward in a direction perpendicular to the axis of the chuck body in a first movement in response to an axial movement of the plunger and a wedging action of the master jaw body and in a rearward direction parallel to the axis of the chuck body in a second movement.

11. The chuck body of claim 10, wherein the driving means comprises an elastic member disposed at the rear end of the master jaw body with a space and a groove disposed on a surface of a rear plate of the chuck body.

12. The chuck body of claim 10, wherein a shape of the bushing is a cylinder.

* * * * *